US010024434B2

(12) United States Patent
Ozaki et al.

(10) Patent No.: US 10,024,434 B2
(45) Date of Patent: Jul. 17, 2018

(54) SHAFT SEAL DEVICE AND ROTARY MACHINE

(71) Applicant: MITSUBISHI HEAVY INDUSTRIES, LTD., Tokyo (JP)

(72) Inventors: Kohei Ozaki, Tokyo (JP); Hidekazu Uehara, Tokyo (JP); Shin Nishimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/111,233

(22) PCT Filed: Jan. 27, 2015

(86) PCT No.: PCT/JP2015/052143
§ 371 (c)(1),
(2) Date: Jul. 13, 2016

(87) PCT Pub. No.: WO2015/115400
PCT Pub. Date: Aug. 6, 2015

(65) Prior Publication Data
US 2016/0334020 A1 Nov. 17, 2016

(30) Foreign Application Priority Data
Jan. 28, 2014 (JP) .................................. 2014-013442

(51) Int. Cl.
*F01D 11/02* (2006.01)
*F16J 15/3288* (2016.01)
(Continued)

(52) U.S. Cl.
CPC ......... *F16J 15/3288* (2013.01); *F01D 11/001* (2013.01); *F16J 15/3292* (2013.01); *F05D 2240/59* (2013.01)

(58) Field of Classification Search
CPC ... F16J 15/3288; F16J 15/3292; F01D 11/001
(Continued)

(56) References Cited

U.S. PATENT DOCUMENTS 6,267,381 B1  7/2001  Wright
6,976,680 B2 * 12/2005  Uehara ................ F16J 15/3292
                                              277/355
(Continued)

FOREIGN PATENT DOCUMENTS

CN      1963270     5/2007
JP    2002-364308  12/2002
(Continued)

OTHER PUBLICATIONS

International Search Report dated Apr. 21, 2015 in corresponding International Application No. PCT/JP2015/052143.
(Continued)

*Primary Examiner* — Nathan Cumar
(74) *Attorney, Agent, or Firm* — Wenderoth, Lind & Ponack L.L.P.

(57) ABSTRACT

A rotary machine (100) includes a rotor (5) that rotates about an axis, a seal housing (30) that is disposed so as to face an outer peripheral surface of the rotor (5), and a seal body (10) that includes a plurality of thin plates (20) extending inward from the seal housing (30) in a radial direction and laminated in a circumferential direction. One thin plate (20) of the plurality of thin plates (20) has a shape in which the thin plate comes into contact with the other thin plates (20) provided on front and rear sides in a rotational direction in a state in which the thin plate does not come into contact with the rotor (5).

4 Claims, 5 Drawing Sheets

(51) Int. Cl.
*F16J 15/3292* (2016.01)
*F01D 11/00* (2006.01)

(58) Field of Classification Search
USPC .................................................. 277/345, 355
See application file for complete search history.

(56) References Cited

U.S. PATENT DOCUMENTS

| | | | |
|---|---|---|---|
| 2007/0085277 A1 | 4/2007 | Rhodes et al. | |
| 2007/0102886 A1* | 5/2007 | Uehara ................... | F01D 11/00 277/355 |
| 2009/0196742 A1* | 8/2009 | Turnquist ............... | F16J 15/441 415/174.2 |
| 2012/0261884 A1* | 10/2012 | Uehara ................. | F01D 11/001 277/411 |
| 2013/0154199 A1 | 6/2013 | Williams | |

FOREIGN PATENT DOCUMENTS

| | | |
|---|---|---|
| JP | 2007-132432 | 5/2007 |
| JP | 2009-185811 | 8/2009 |
| JP | 2011-185219 | 9/2011 |
| JP | 2013-104562 | 5/2013 |

OTHER PUBLICATIONS

Written Opinion of the International Searching Authority dated Apr. 21, 2015 in corresponding International Application No. PCT/JP2015/052143.
First Office Action dated Mar. 1, 2017 in corresponding Chinese Application No. 201580003534.2 (with English translation).

* cited by examiner

SHAFT SEAL DEVICE AND ROTARY MACHINE

TECHNICAL FIELD

The present invention relates to a shaft seal device and a rotary machine.

BACKGROUND ART

Generally, in a rotary machine, such as a gas turbine or a steam turbine, a shaft seal device is used to prevent working fluid from leaking to the low-pressure side from the high-pressure side through an annular gap that is formed between a stationary portion and a rotatable portion. A non-contact labyrinth seal is widely used as one of such shaft seal devices. However, the non-contact labyrinth seal needs to be formed so that an end of a seal fin does not come into contact with a shaft even when the shaft is vibrated or excessively thermally deformed during a rotational transition (during starting, stopping, and the like). For this reason, a gap (a seal clearance) between ends of the seal fins needs to be large to some extent. Meanwhile, when the seal clearance is excessively large, working fluid leaks.

For example, PTL 1 discloses a shaft seal device that reduces the leakage of the working fluid. This shaft seal device includes a seal body in which flat thin plates having a predetermined width in an axial direction of a rotor are disposed in a circumferential direction of the rotor in the form of multiple layers.

In the seal device, inner periphery-side end portions of the thin plates come into contact with the rotor during stopping of the rotor. Meanwhile, during the rotation of the rotor, a floating effect acts on the thin plates by the effect of dynamic pressure, and the inner periphery-side end portions of the thin plates float from the rotor. Accordingly, during the rotation of the rotor, the thin plates do not come into contact with the rotor while the minimum clearance is formed between the rotor and the thin plates.

CITATION LIST

Patent Literature

[PTL 1] Japanese Unexamined Patent Application, First Publication No. 2013-104562

SUMMARY OF INVENTION

Technical Problem

However, since a gap is formed between the plurality of adjacent thin plates in the shaft seal device disclosed in PTL 1, there is a possibility that the inner periphery-side end portions of the thin plates may cause flutter during the operation of the rotor.

The invention has been made in consideration of the above-mentioned circumstances, and an object of the invention is to provide a rotary machine that can suppress flutter.

Solution to Problem

According to a first aspect of the invention, a shaft seal device including a housing that is disposed so as to face an outer peripheral surface of a rotor rotating about an axis, and a seal body that includes a plurality of thin plates extending inward from the housing in a radial direction of the rotor and laminated in a circumferential direction of the rotor, wherein the plurality of thin plate includes: a contact portion that is formed of an area in which the thin plate comes into surface contact with the other thin plates provided on front and rear sides in a rotational direction of the rotor and which includes radially inner end portions of the thin plates; a non-contact portion which is formed of an area present outside the contact portion in the radial direction and in which the thin plate does not come into surface contact with the other thin plates; and wherein the shaft seal device is provided with a biasing member that is provided between the seal body and the housing and biases the seal body to the outside in the radial direction; wherein the plurality of thin plates are arranged so that an angle between the thin plate and the outer peripheral surface of the rotor is gradually increased toward a front side from a rear side in the rotational direction of the rotor during the stop of the rotor, and are thus pressed against each other in the circumferential direction of the rotor.

According to the above-mentioned structure, since end portions of the thin plates adjacent to each other come into surface contact with each other in the operating state of the rotor, the movement of these thin plates is restricted.

Moreover, according to the above-mentioned structure, since a force generated by the biasing member and a floating force acting on the thin plates are balanced in the operating state of the rotor, a sealing effect can be stably obtained.

According to a second aspect of the invention, in the shaft seal device according to the first aspect, a low-pressure side plate and a high-pressure side plate may be provided on a low-pressure side and a high-pressure side so that the thin plates are interposed between the low-pressure side plate and the high-pressure side plate, and an area of each thin plate exposed from the low-pressure side plate on the low-pressure side may be larger than that on the high-pressure side.

According to the above-mentioned structure, the exposed area of each thin plate on the high-pressure side of the shaft seal device can be made smaller than that on the low-pressure side.

According to a third aspect of the invention, in the shaft seal device according to any one of the above-mentioned aspects, the thin plate may come into surface contact with the other thin plates provided on the front and rear sides in the rotational direction in a state in which the thin plates do not come into contact with the rotor.

According to the above-mentioned structure, since the plurality of thin plates adjacent to each other come into surface contact with each other, it is possible to obtain a high sealing effect even in a state in which the rotational speed of the rotor is low such as a state in which the rotor starts or a state in which the rotor stops.

In addition, a rotary machine according to a fifth aspect of the invention may include the shaft seal device according to any one of the above-mentioned aspects.

According to the above-mentioned structure, it is possible to obtain a rotary machine that has a high sealing effect and a long service life.

Advantageous Effects of Invention

According to the above-mentioned shaft seal device and the above-mentioned rotary machine, it is possible to suppress the generation of flutter of the rotor that is in an operating state.

DESCRIPTION OF EMBODIMENTS (First Embodiment)

Figure 1:
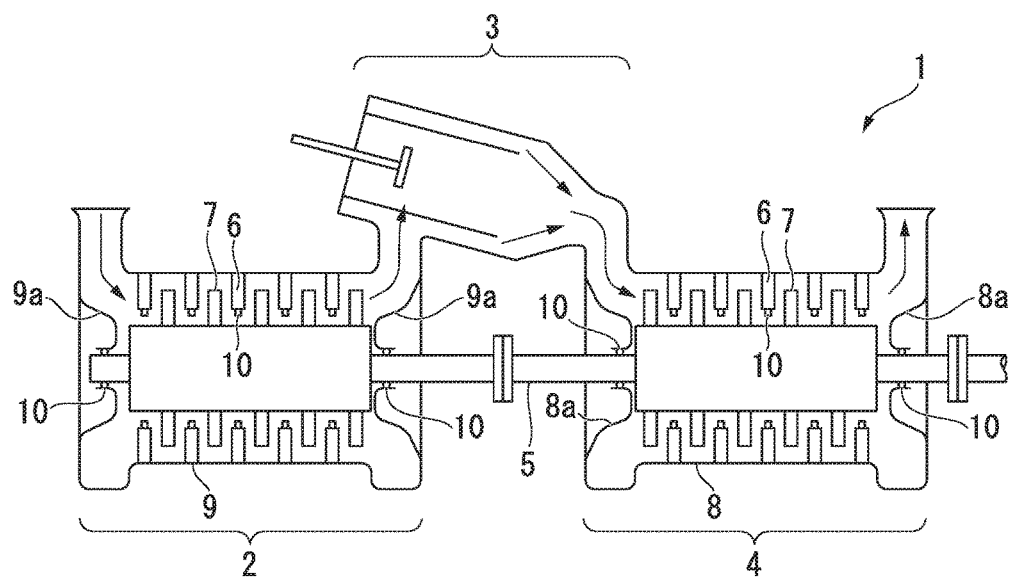
FIG. 1 is a view showing the schematic structure of a gas turbine (a rotary machine) according to each embodiment of the invention.

A first embodiment of the invention will be described in detail below with reference to the drawings. An example in which seal bodies 10 are applied to a gas turbine (a rotary machine) 1 will be described in this embodiment. FIG. 1 is a view showing the schematic structure of the gas turbine 1 according to this embodiment.

The gas turbine 1 shown in FIG. 1 includes a compressor 2 that takes in and compresses a large amount of air, a combustor 3 that mixes the air compressed by the compressor 2 with fuel and combusts a mixture thereof, a turbine 4 into which combustion gas generated in the combustor 3 is introduced and which converts the thermal energy of the combustion gas into rotational energy and rotates, and a rotor 5 that transmits a part of rotational power of the turbine 4 to the compressor 2 to rotate the compressor 2.

The turbine 4 generates power by blowing the combustion gas to rotor blades 7 of the rotor 5 to convert the thermal energy of the combustion gas into mechanical rotational energy. The turbine 4 is provided with a plurality of stator blades 6 that are provided on a casing 8 of the turbine 4, in addition to a plurality of rotor blades 7 that are provided on the rotor 5. The rotor blades 7 and the stator blades 6 are alternately arranged in the axial direction of the rotor 5.

The rotor blades 7 rotate the rotor 5 about an axis under the pressure of the combustion gas flowing in the axial direction. Rotational energy, which is applied to the rotor 5, is taken out of an end of a shaft and is used. A seal body 10 is provided between each stator blade 6 and the rotor 5, as a shaft seal that reduces the amount of combustion gas leaking to the low-pressure side from the high-pressure side.

The compressor 2 is coaxially connected to the turbine 4 by the rotor 5. Accordingly, the compressor 2 compresses external air by using the rotation of the turbine 4 to generate compressed air. This compressed air is supplied to the combustor 3. Similar to the turbine 4, the compressor 2 is also provided with a plurality of rotor blades 7 that are provided on the rotor 5 and a plurality of stator blades 6 that are provided on a casing 9 of the compressor 2. The rotor blades 7 and the stator blades 6 are alternately arranged in the axial direction of the rotor 5. Moreover, the seal body 10 is also provided between each stator blade 6 and the rotor 5. The seal body 10 is provided to reduce the amount of compressed air leaking to the low-pressure side from the high-pressure side. In addition, the seal bodies 10 for preventing compressed air or combustion gas from leaking to the low-pressure side from the high-pressure side are provided at not only bearing portions 9a where the casing 9 of the compressor 2 supports the rotor 5 but also bearing portions 8a where the casing 9 of the turbine 4 supports the rotor 5.

Here, the application of the seal body 10 according to this embodiment is not limited to the application to the gas turbine 1. The seal body 10 can be widely employed to the whole range of rotary machines that convert energy into work by the rotation of a shaft and the flow of fluid as in large fluid machines, such as a steam turbine, a compressor, a water wheel, a refrigerator, and a pump. Moreover, the seal body 10 can also be used to suppress the flow of fluid in the axial direction of the rotor 5.

Figure 2:
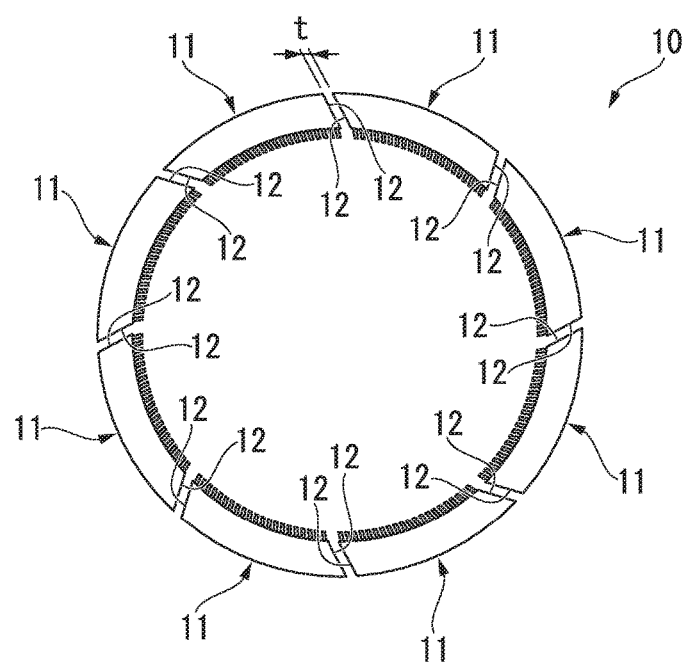
FIG. 2 is a view showing the schematic structure of a seal body according to a first embodiment of the invention that is seen in an axial direction of the rotary machine.

Next, the structure of the seal body 10 provided in the gas turbine 1 having the above-mentioned structure will be described with reference to the drawings. FIG. 2 is a view showing the schematic structure of the seal body 10 that is seen in the axial direction of the rotor 5. The seal body 10 includes a plurality of (eight in this embodiment) arc-shaped shaft seal devices 11 that are disposed in an annular shape along the circumferential direction of the rotor 5. A gap t is formed between circumferential ends 12 and 12 of the adjacent shaft seal devices 11 that are disposed as described above.

Figure 3:
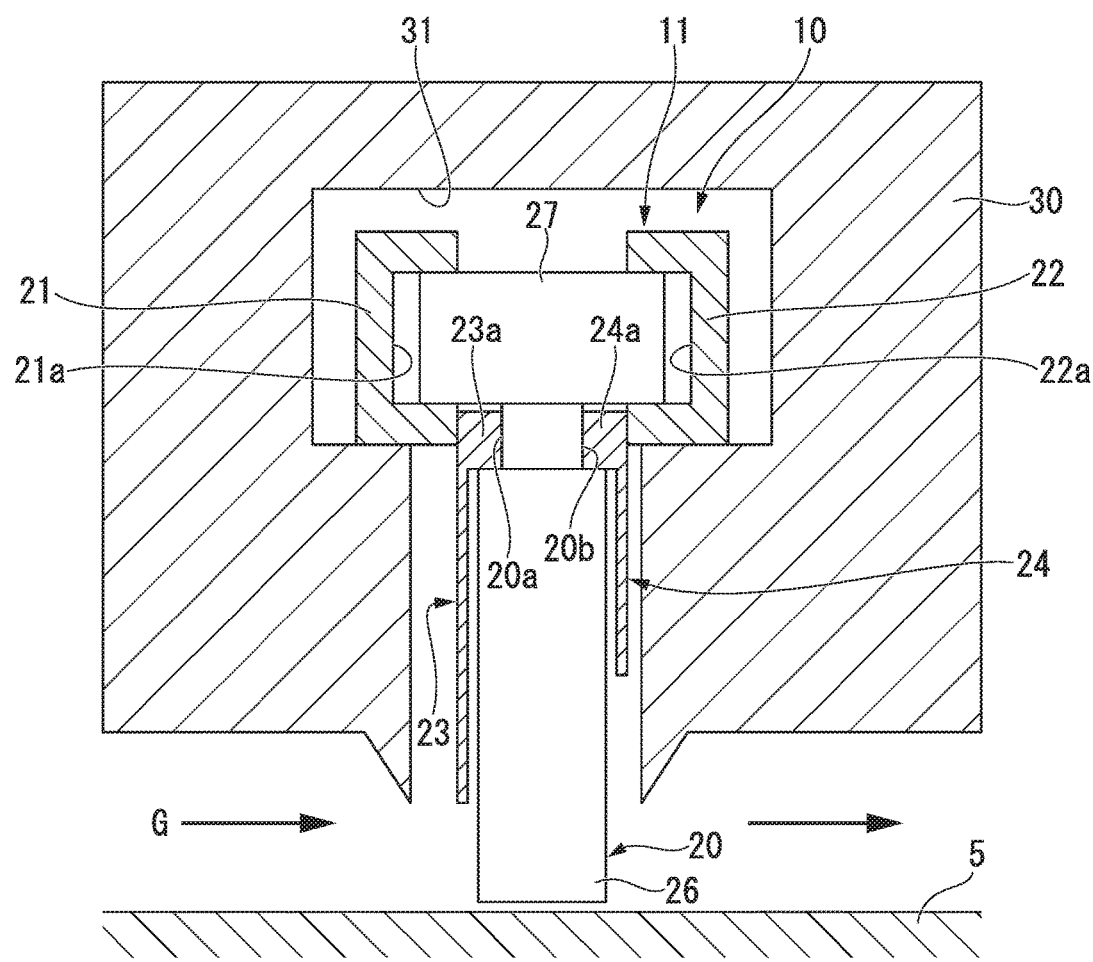
FIG. 3 is a cross-sectional view of the seal body according to the first embodiment of the invention taken along a circumferential direction.

The structure of each shaft seal device 11 will be described with reference to FIG. 3. FIG. 3 is a view showing the structure of the shaft seal device 11 in a cross-section including the axis of the rotor 5. Each shaft seal device 11 is inserted into a housing 30 (corresponding to the stator blade 6, the rotor blade 7, and the bearing portions 8a and 9a), and is installed so as to prevent the leakage of working fluid through an annular space between the rotor 5 and the housing 30.

The shaft seal device 11 includes a plurality of thin plates 20, retaining rings 21 and 22, a high-pressure side plate 23, and a low-pressure side plate 24. The thin plates 20 are members that are made of metal and are multiply arranged at small intervals in the circumferential direction of the rotor 5. The retaining rings 21 and 22 are adapted so that the thin plates 20 are interposed between the retaining rings 21 and 22 at outer periphery-side base ends 27 of the thin plates 20. The circumferential cross-section of each of the retaining rings 21 and 22 has a substantially C shape. The high-pressure side plate 23 is interposed between one edge, which faces a high-pressure area, of the thin plate 20 and the retaining ring 21. Moreover, the low-pressure side plate 24 is interposed between the other edge, which faces a low-pressure area, of the thin plate 20 and the retaining ring 22.

In the seal body 10 having the above-mentioned structure, the thin plate 20 is formed so that the width of an inner periphery-side portion of the thin plate 20 (the width of the inner periphery-side portion of the thin plate 20 in the axial direction of the rotor 5) is smaller than the width of the outer periphery-side base end 27 (the width of the outer periphery-side base end 27 in the axial direction of the rotor 5). Accordingly, the thin plate 20 is formed of a thin steel plate having a substantially T shape. Cut-out portions 20a and 20b are formed on both side edges of each thin plate 20 at a position where the width of the thin plate 20 is reduced.

The plurality of thin plates 20 are laminated in the circumferential direction (a rotational direction d) of the rotor 5. Moreover, the outer periphery-side base ends 27 of the plurality of adjacent thin plates 20 are fixed and connected to each other by, for example, welding.

The thin plate 20 has predetermined stiffness, which is based on the thickness, in the circumferential direction of the rotor 5. In addition, the thin plates 20 are fixed to the retaining rings 21 and 22 so that an angle between the thin plate 20 and the peripheral surface of the rotor 5 in the rotational direction of the rotor 5 is an acute angle.

Figure 4:
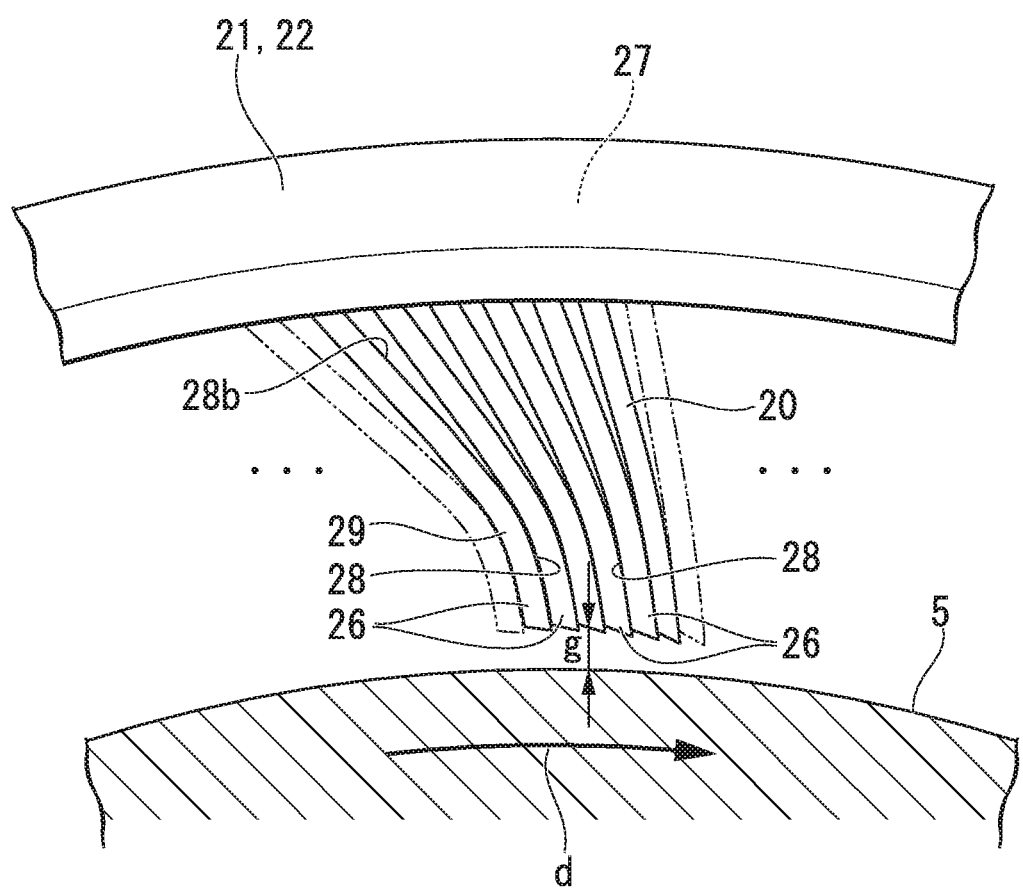
FIG. 4 is an enlarged view of main portions of the seal body according to the first embodiment of the invention.

The disposition of the thin plates 20 will be described in detail with reference to FIG. 4. As shown in FIG. 4, the thin plates 20 are arranged in each shaft seal device 11 so that an angle between the thin plate 20 and the peripheral surface of the rotor 5 is gradually increased (the angle between the thin plate 20 and the peripheral surface of the rotor 5 is an obtuse angle) toward the front side from the rear side in the rotational direction d of the rotor 5.

A small gap g is formed between an inner periphery-side end portion 26, which is an end portion of the thin plate 20 facing the rotor 5, and the rotor 5 so as to prevent a leaf of the turbine, which is being transitionally changed (temperature, pressure), from coming into contact with the rotor.

In addition, the plurality of adjacent thin plates 20 come into surface contact with each other forward/rearward in the rotational direction d of the rotor 5 near the inner periphery-side end portions 26, and form contact portions 28. In other words, the thin plates 20 come into contact with each other in the areas including the radially inner end portions of the thin plates 20, and form the contact portions 28. On the other hand, the thin plates 20 are spaced apart from each other on the outer peripheral side of the contact portions 28, and form non-contact portions 28b. Here, the non-contact portion 28b means an area that is positioned on the surface of the thin plate 20 in the area where the thin plates 20 are spaced apart from each other.

Since the thin plate 20 is formed of a steel plate as described above, the thin plate 20 has a constant elastic restoring force (flexibility). In other words, a force, which presses the thin plates 20 against each other, acts on the plurality of adjacent thin plates 20. Accordingly, a curved portion 29 is formed on the outer peripheral side of the contact portion 28 by elastic deformation. The thin plate 20 is curved rearward in the rotational direction d at the curved portion 29.

Moreover, as shown in FIG. 3, the high-pressure side plate 23 and the low-pressure side plate 24 are provided with stepped portions 23a and 24a so that the width of an outer peripheral portion of each of the high-pressure side plate 23 and the low-pressure side plate 24 in the axial direction of the rotor 5 is large, and the stepped portions 23a and 24a are fitted to the cut-out portions 20a and 20b of the thin plate 20, respectively.

The retaining ring 21 includes a recessed groove 21a that is formed on the surface thereof facing one side edge (high-pressure side) of the outer periphery-side base end 27 of each of the plurality of thin plates 20. The retaining ring 22 includes a recessed groove 22a that is formed on the surface thereof facing the other side edge (low-pressure side) of the outer periphery-side base end 27 of each of the plurality of thin plates 20. One side edge (high-pressure side) of the outer peripheral portion of each of the plurality of thin plates 20 where the stepped portions 23a and 24a of the high-pressure side plate 23 and the low-pressure side plate 24 are fitted to the cut-out portions 20a and 20b is fitted to the recessed groove 21a of the retaining ring 21. In addition, the other side edge (low-pressure side) of the outer peripheral portion thereof is fitted to the recessed groove 22a of the retaining ring 22. Each thin plate 20 is fixed to the retaining rings 21 and 22 by this structure.

Meanwhile, an annular recessed groove 31 is formed on the inner peripheral wall surface of the housing 30, and the annular recessed groove 31 is formed in a shape in which stepped portions are formed on the side surfaces of the annular recessed groove 31 facing one side edge (high-pressure side) and the other side edge (low-pressure side) of the thin plate 20 so that the width of an outer peripheral portion of the annular recessed groove 31 in the axial direction of the rotor 5 is larger than the width of an inner peripheral portion thereof. Further, the thin plates 20, the retaining rings 21 and 22, the high-pressure side plate 23, and the low-pressure side plate 24 are fitted into the recessed groove 31 of the housing 30 so that the surfaces of the retaining rings 21 and 22 facing the inner peripheral side come into contact with the surfaces of the stepped portions facing the outer peripheral side. The inner periphery-side end portion 26 of each thin plate 20 protrudes from the high-pressure side plate 23 toward the rotor 5. Meanwhile, the inner periphery-side end portion 26 of each thin plate 20 protrudes from the low-pressure side plate 24 toward the rotor 5, but the length of a portion of the inner periphery-side end portion 26 protruding from the low-pressure side plate 24 is set to be larger than the length of a portion of the inner periphery-side end portion 26 protruding from the high-pressure side plate 23. That is, the area of each thin plate 20 exposed to working fluid G on the low-pressure side is larger than that of each thin plate 20 exposed to the working fluid G on the high-pressure side. In other words, the high-pressure side plate 23 shields a larger range of the side surface of each thin plate 20 from the working fluid G Next, the operation of the seal body 10 having the above-mentioned structure will be described with reference to FIGS. 5A and 5B.

Figure 5A:
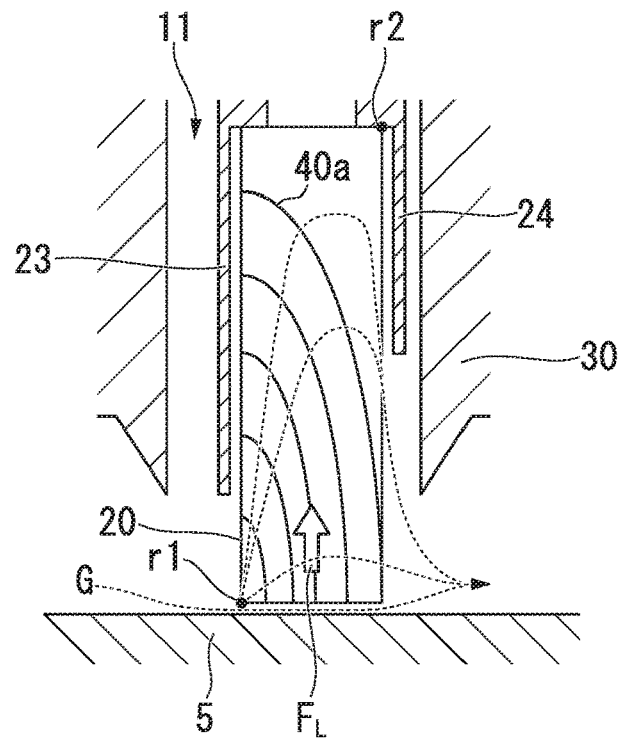
FIG. 5A is a view showing the pressure distribution of the seal body according to the first embodiment of the invention.

As shown in FIG. 5A, gas pressure distribution 40a in which gas pressure is highest in the vicinity of the inner periphery-side end portion 26 of each thin plate 20 and at a corner r1 of each thin plate 20 positioned on the high-pressure side and gas pressure is gradually reduced toward an opposite corner r2 is formed in a case in which the gas pressure of working fluid, which flows toward the low-pressure area from the high-pressure area, is applied to each thin plate 20. Meanwhile, the thin plate 20 has a T shape in FIG. 3, but only a rectangular portion to be bent is shown and the other portions are omitted in FIGS. 5A and 5B for ease of description.

Figure 5B:
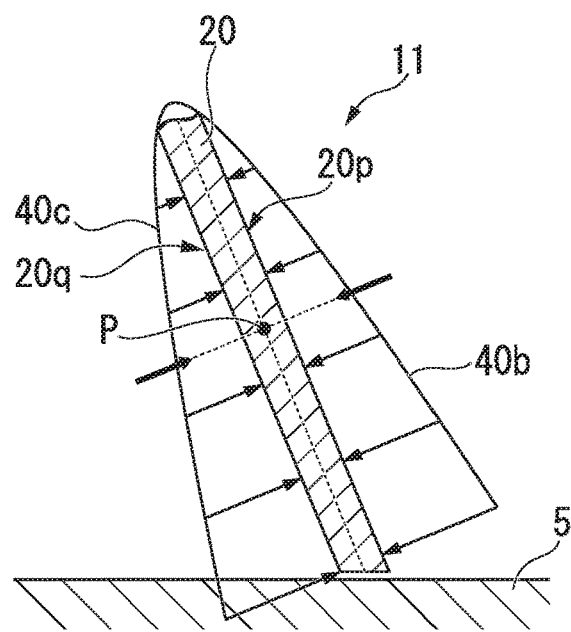
FIG. 5B is a view showing the pressure distribution of the seal body according to the first embodiment of the invention.

As shown in FIG. 5B, the surface of each thin plate 20 facing the rotor 5 is referred to as a lower surface 20q and the surface thereof opposite to the lower surface 20q is referred to as an upper surface 20p. When gas pressure applied from the high-pressure area toward the low-pressure area is applied to each thin plate 20, the gas pressure distribution 40a is formed as shown in FIG. 5A. In this case, gas pressure is adjusted so that gas pressure applied to the lower surface 20q is higher than gas pressure that is applied to the upper surface 20p at an arbitrary position along the cross-section of each thin plate 20.

The working fluid G, which flows to the low-pressure area from the high-pressure area, flows in from a gap between the high-pressure side plate 23 and the outer peripheral surface of the rotor 5. After that, as shown in FIG. 5A, the working fluid G flows between the outer peripheral surface of the rotor 5 and the inner periphery-side end portion 26 of each thin plate 20 and radially flows toward the corner r2 from the corner r1 along the upper and lower surfaces 20p and 20q of each thin plate 20. Since the working fluid G flows in this way, a low-pressure area is broadened toward the outer periphery-side base end 27 of each thin plate 20. For this reason, distributions 40b and 40c of gas pressure, which is applied perpendicular to the upper and lower surfaces 20p and 20q of each thin plate 20, are in a state shown in FIG. 5B. In more detail, the gas pressure distributions 40b and 40c are formed in the shape of a triangular distribution in which gas pressure is increased toward the inner periphery-side end portion 26 of each thin plate 20 and is reduced toward the outer periphery-side base end 27 of each thin plate 20.

The gas pressure distributions 40b and 40c on the upper and lower surfaces 20p and 20q are line-symmetric with respect to the thin plate 20. However, since each thin plate 20 is disposed so that an angle between the thin plate 20 and the peripheral surface of the rotor 5 is an acute angle, the relative positions of the respective gas pressure distributions 40b and 40c in the radial direction of the rotor 5 deviate from each other. Accordingly, a difference is generated between the gas pressure on the upper surface 20p and the gas pressure on the lower surface 20q at an arbitrary point P that is directed to the inner periphery-side end portion 26 from the outer periphery-side base end 27 of the thin plate 20. In other words, gas pressure, which is applied to the lower surface 20q of the thin plate 20, is higher than the gas pressure that is applied to the upper surface 20p of the thin plate 20. Accordingly, a floating force FL, which allows the inner periphery-side end portion 26 to float from the rotor 5, is applied to the inner periphery-side end portion 26 of the thin plate 20.

Since a difference in pressure is generated between the upper and lower surfaces 20p and 20q of each thin plate 20 as described above, the floating force FL acts on each thin plate 20. In addition, the inner periphery-side end portion 26 of the thin plate 20 is elastically deformed so as to float from the outer peripheral surface of the rotor 5.

Here, in a case in which the adjacent thin plates 20 are arranged with an interval interposed therebetween, flutter (small vibration) is generated at the inner periphery-side end portion 26 of the thin plate 20 due to the change of pressure, which is applied to the thin plate 20, and the elastic restoring force of the thin plate 20.

However, the thin plate 20 of this embodiment comes into surface contact with the other adjacent thin plate 20. For this reason, the movement of the inner periphery-side end portion 26 of the thin plate 20 in the circumferential direction is restricted while the elastic force of the inner periphery-side end portion 26 of the thin plate 20 is maintained. Accordingly, the generation of the flutter of the inner periphery-side end portion 26 of the thin plate 20 is suppressed.

In a case in which flutter (small vibration) is generated on the thin plate 20, bending stress is locally concentrated on an area that serves as the fulcrum of vibration. For this reason, there is a possibility that fatigue failure associated with long-term use may occur. However, since the thin plate 20 of this embodiment comes into surface contact with the other adjacent thin plate 20 as described above, the generation of flutter and the fatigue failure of the thin plate 20 caused by the generation of flutter are suppressed.

Moreover, since the floating force FL acts on the inner periphery-side end portion 26 of the thin plate 20 during the rotation of the rotor 5, the thin plate 20 floats from the rotor 5 and is stably maintained in a non-contact state.

Accordingly, since the movement of the inner periphery-side end portion 26 of the thin plate 20 in the circumferential direction is restricted while the flexibility of the inner periphery-side end portion 26 of the thin plate 20 is maintained, it is possible to suppress the generation of flutter of the inner periphery-side end portion 26 of the thin plate 20.

Moreover, even in a case in which the rotor 5 is displaced in the radial direction due to vibration that is generated during starting, stopping, and the like of the rotor 5 by the elastic force of the thin plate 20, it is possible to maintain a high sealing effect.

In addition, since the high-pressure side plate 23 protrudes from the low-pressure side plate 24 toward the rotor 5 as described above, the range of the thin plate 20, which is shielded from the working fluid G on the high-pressure side from which the working fluid G flows, is larger than the range of the thin plate 20 that is shielded from the working fluid G on the low-pressure side. Accordingly, internal pressure of a leaf seal maintains the balance of a force applied to a leaf so that an end of the leaf floats. As a result, since the leaf does not come into strong contact with the rotor, it is possible to prevent damage that is caused by the wear of the leaf.

(Second Embodiment)

Next, a second embodiment of the invention will be described with reference to FIG. 6. The same components as the components of the first embodiment will be denoted by the same reference numerals, and the detailed description thereof will be omitted.

Figure 6:
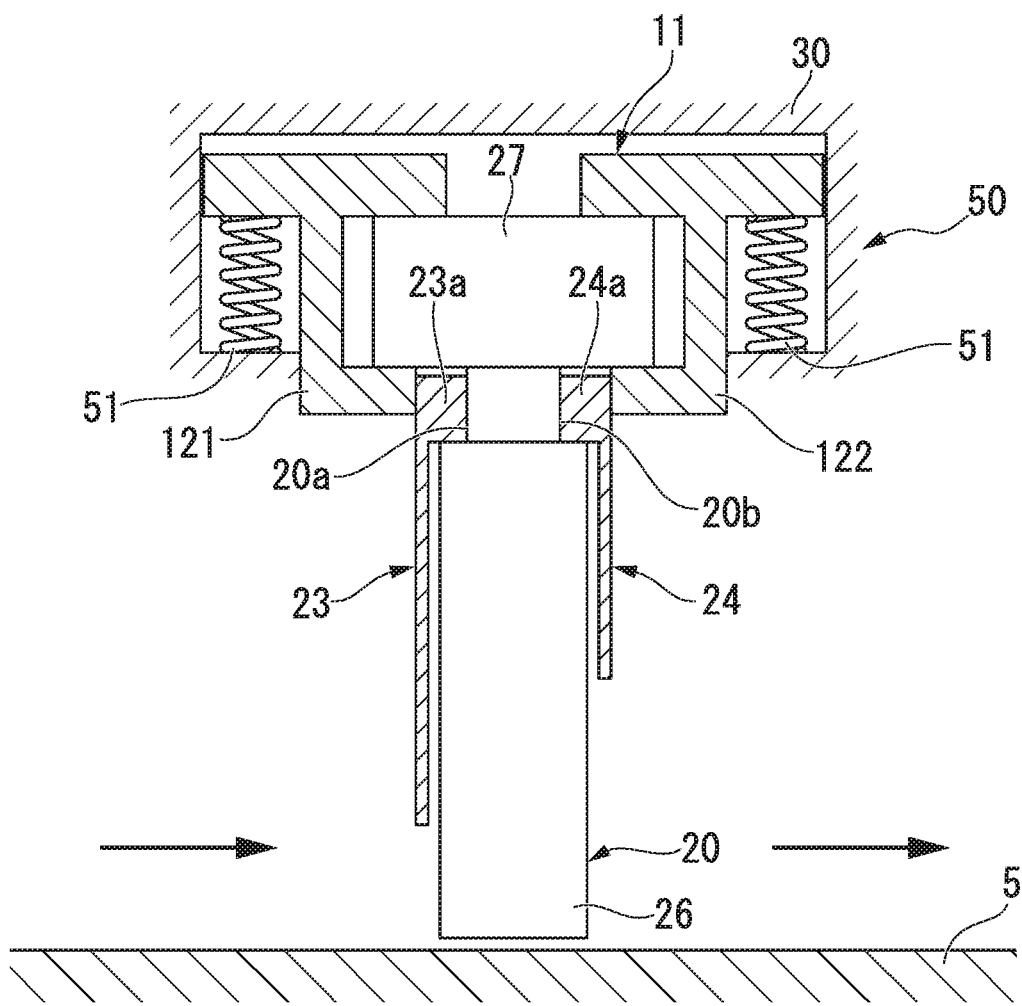
FIG. 6 is a cross-sectional view of a seal body according to a second embodiment of the invention taken along a circumferential direction.

FIG. 6 is a cross-sectional view of a shaft seal device 11 according to a second embodiment of the invention taken along a circumferential direction.

The second embodiment is different from the above-mentioned embodiment in that the shaft seal device 11 of this embodiment includes a well-known ACC system (an active clearance control system) 50 on the outside thereof in a radial direction. The ACC system includes biasing members 51 in a housing 30.

For example, a spring member is used as the biasing member 51. Further, a pneumatic cylinder other than the spring member may be used as the biasing member 51. However, since working fluid having high temperature and high pressure flows in a rotary machine 1, the biasing member 51 also needs to be a member that is designed so as to normally operate at a high temperature.

The biasing members 51 are connected to retaining rings 121 and 122 and the housing 30. Moreover, the biasing members 51 are biased to the outside in the extending direction.

Accordingly, the shaft seal device 11 according to this embodiment is biased to the outside in the radial direction by the action of the biasing members 51.

Therefore, an inner periphery-side end portion 26 of each thin plate 20 is supported so as to have a small gap between the outer surface of the rotor 5 and itself during stopping of the rotor 5. Meanwhile, in a case in which the rotor 5 is rotated, pressure for biasing the shaft seal device 11 to the inside in the radial direction is generated by the action of differential pressure between the high-pressure side and the low-pressure side. In other words, a gap between the inner periphery-side end portion 26 of each thin plate 20 and the outer surface of the rotor 5 during the rotation of the rotor 5 is smaller than that during stopping of the rotor 5.

Since the ACC system 50 is provided as described above, a gap between the thin plate 20 and the rotor 5 is formed. Accordingly, wear, which is caused by the sliding contact between the rotor 5 and the thin plate 20 during the starting, is suppressed. In addition, since a force generated by the biasing members 51 and the above-mentioned floating force FL are balanced in an operating state of the rotor 5, a sealing effect can be stably obtained. Moreover, the seal body can also be employed at a portion that is significantly deformed thermally during the operation.

The embodiments and examples of the invention have been described in detail above. However, the respective components of the respective embodiments, the combinations thereof, and the like are exemplary, and components can be added, omitted, replaced, and modified without departing from the scope of the invention.

INDUSTRIAL APPLICABILITY

The above-mentioned shaft seal device can be applied to rotary machines, such as a centrifugal compressor and a gas turbine. In such a shaft seal device and a rotary machine, the generation of flutter can be suppressed in an operating state of the rotor.

REFERENCE SIGNS LIST

1: rotary machine (gas turbine)
2: compressor
3: combustor
4: turbine
5: rotor
6: stator blade
7: rotor blade
8: casing
8a, 9a: bearing portion
10: seal body
11: shaft seal device
12: circumferential end
20: thin plate
20a: cut-out portion
20p: upper surface
20q: lower surface
21, 22: retaining ring
23: high-pressure side plate
24: low-pressure side plate
26: inner periphery-side end portion
27: outer periphery-side base end
28: contact portion
28b: non-contact portion
29: curved portion
30: housing
31: recessed groove
40a, 40b, 40c: gas pressure distribution
50: ACC system
51: biasing member
121, 122: retaining ring
FL: floating force
g: gap
G: working fluid
r1, r2: corner

The invention claimed is:

1. A shaft seal device including a housing that is disposed so as to face an outer peripheral surface of a rotor rotating about an axis, and a seal body that includes a plurality of thin plates extending inward from the housing in a radial direction of the rotor and laminated in a circumferential direction of the rotor,
wherein the plurality of thin plates include:
a contact portion that is formed of an area in which the thin plate comes into surface contact with the other thin plates provided on front and rear sides in a rotational direction of the rotor and which includes radially inner end portions of the thin plates; and
a non-contact portion which is formed of an area present outside the contact portion in the radial direction and in which the thin plate does not come into surface contact with the other thin plates;
wherein the plurality of thin plates are arranged so that an angle between the thin plate and the outer peripheral surface of the rotor is gradually increased toward a front side from a rear side in the rotational direction of the rotor during the stop of the rotor, and are thus pressed against each other in the circumferential direction of the rotor, and come into surface contact with the other thin plates provided on the front and rear sides in the rotational direction of the rotor; and
wherein the plurality of thin plates are pressed against each other during the stop of the rotor such that a curved portion is formed on the outer peripheral side of the contact portion by elastic deformation, and the plurality of thin plates are curved rearward in the rotational direction at the curved portion.

2. The shaft seal device according to claim 1,
wherein a low-pressure side plate and a high-pressure side plate are provided on a low-pressure side and a high-pressure side so that the thin plates are interposed between the low-pressure side plate and the high-pressure side plate, and
an area of each thin plate exposed from the low-pressure side plate on the low-pressure side is larger than that on the high-pressure side.

3. A rotary machine comprising a shaft seal device, the shaft seal device including a housing that is disposed so as to face an outer peripheral surface of a rotor rotating about an axis, and a seal body that includes a plurality of thin plates extending inward from the housing in a radial direction of the rotor and laminated in a circumferential direction of the rotor,
wherein the plurality of thin plates include:
a contact portion that is formed of an area in which the thin plate comes into surface contact with the other thin plates provided on front and rear sides in a rotational direction of the rotor and which includes radially inner end portions of the thin plates; and
a non-contact portion which is formed of an area present outside the contact portion in the radial direction and in which the thin plate does not come into surface contact with the other thin plates;
wherein the plurality of thin plates are arranged so that an angle between the thin plate and the outer peripheral surface of the rotor is gradually increased toward a front side from a rear side in the rotational direction of the rotor during the stop of the rotor, and are thus pressed against each other in the circumferential direction of the rotor, and come into surface contact with the other thin plates provided on the front and rear sides in the rotational direction of the rotor; and
wherein the plurality of thin plates are pressed against each other during the stop of the rotor such that a curved portion is formed on the outer peripheral side of the contact portion by elastic deformation, and the plurality of thin plates are curved rearward in the rotational direction at the curved portion.

4. The shaft seal device according to claim 1,
wherein the shaft seal device is provided with a biasing member that is provided between the seal body and the housing and biases the seal body to the outside in the radial direction, and wherein the biasing member biases the seal body in a state in which the thin plates do not come into contact with the rotor.

* * * * *